Figure 1:
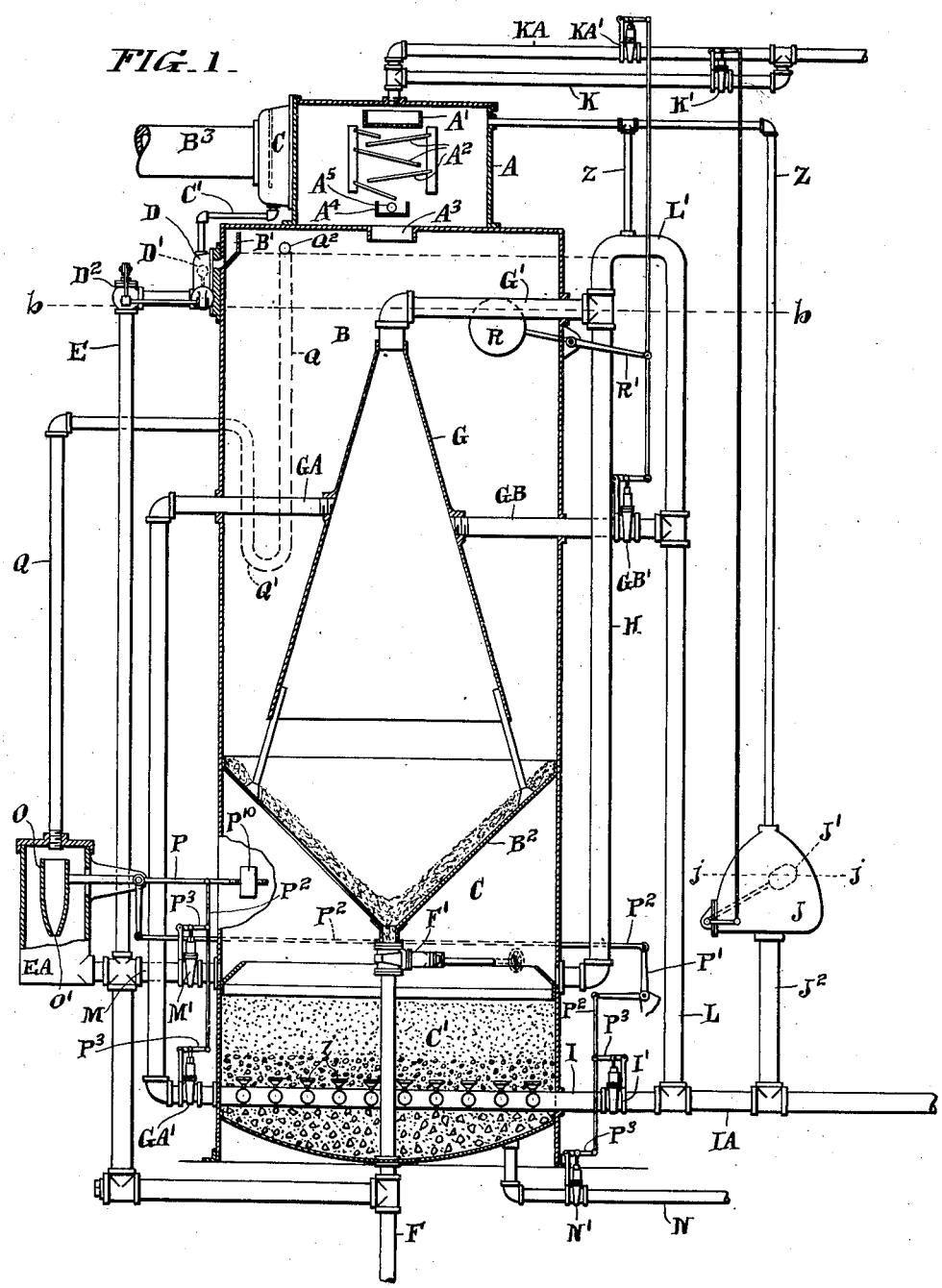

G. H. GIBSON.
WATER PURIFICATION APPARATUS.
APPLICATION FILED SEPT. 22, 1913.

1,119,008.

Patented Dec. 1, 1914.
4 SHEETS—SHEET 1.

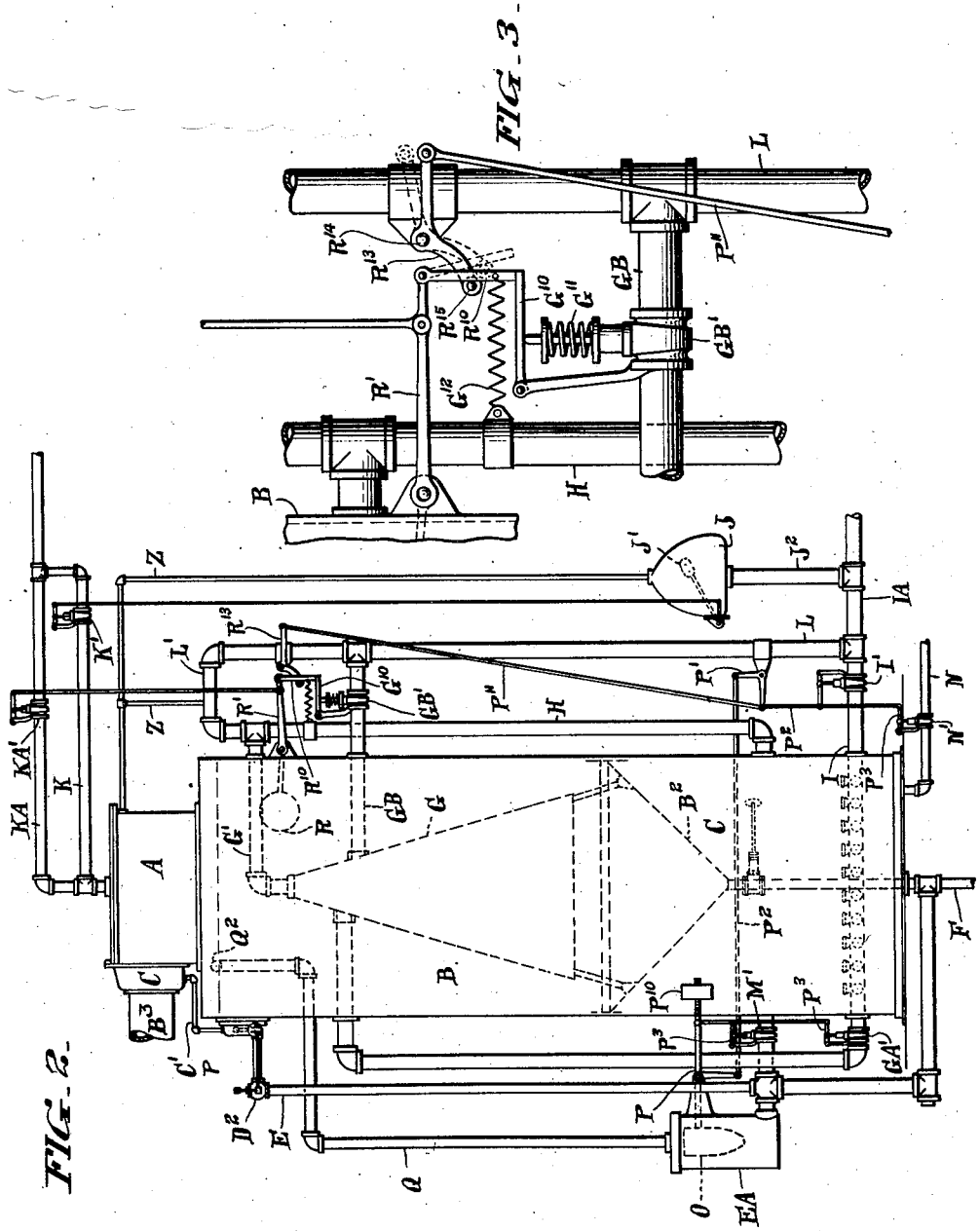

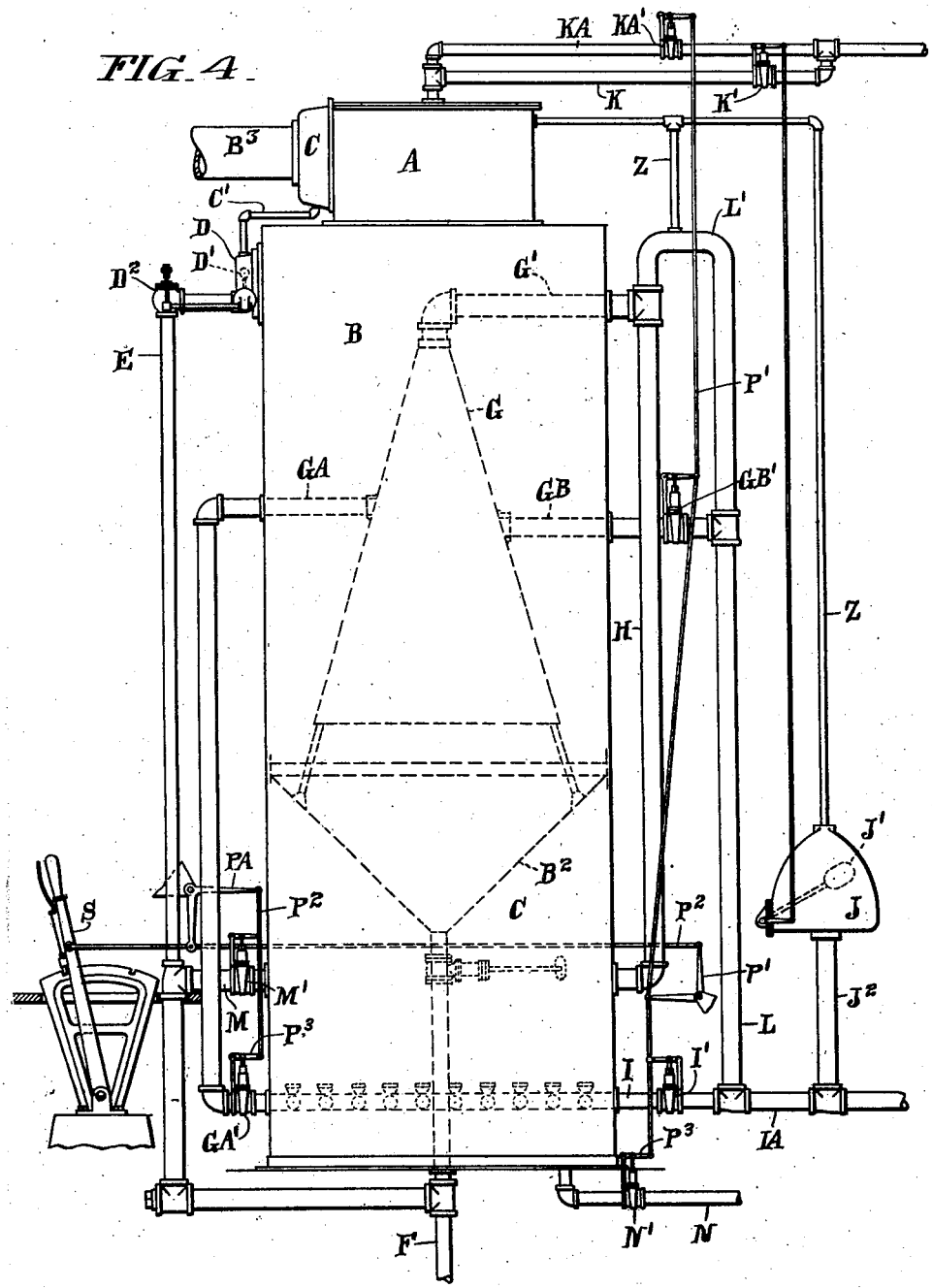

G. H. GIBSON.
WATER PURIFICATION APPARATUS.
APPLICATION FILED SEPT. 22, 1913.

1,119,008.

Patented Dec. 1, 1914.
4 SHEETS—SHEET 4.

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, OF PHILADELPHIA, PENNSYLVANIA, DOING BUSINESS UNDER THE FIRM-NAME OF HARRISON SAFETY BOILER WORKS, OF PHILADELPHIA, PENNSYLVANIA.

WATER-PURIFICATION APPARATUS.

1,119,008.  Specification of Letters Patent.  Patented Dec. 1, 1914.

Application filed September 22, 1913. Serial No. 791,004.

*To all whom it may concern:*

Be it known that I, GEORGE H. GIBSON, a citizen of the United States of America, residing in Montclair, in the county of Essex and State of New Jersey, have invented certain new and useful Improvements in Water-Purification Apparatus, of which the following is a true and exact description, reference being had to the accompanying drawings, which form a part thereof.

My present invention relates to water purifying apparatus of the kind comprising a settling or reaction chamber, and a filter chamber through which the water flows in normal operation from the settling chamber, and usually comprising also, provisions for heating the water, and admixing therewith a chemical purifying reagent or reagents prior to the admission of the water to the settling chamber.

A primary object of my present invention is to combine with such apparatus, means for insuring a sufficient supply of water from the settling chamber to the boiler feed pump, or like device supplied with water, not only in normal operation when the filter freely passes all of the water required, but also, when, by reason of the clogging of the filter, the latter fails to pass any, or passes a part only of the water required, and also during the cleaning or back washing of the filter.

A further object of my invention is to provide means for automatically starting the filter washing operation when the clogging of the filter makes this desirable, and for restoring the apparatus to its normal operating condition when the filter washing operation is completed.

In many cases it is desirable to employ water taken from the settling chamber in washing out the filter, thus making a separate reservoir or supply of filter cleaning water unnecessary; and a specific object of my invention is to combine simple and effective means for accomplishing this with the apparatus employed for attaining the previously mentioned objects of my invention.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described forms of apparatus in which my invention may be embodied.

Figure 5:
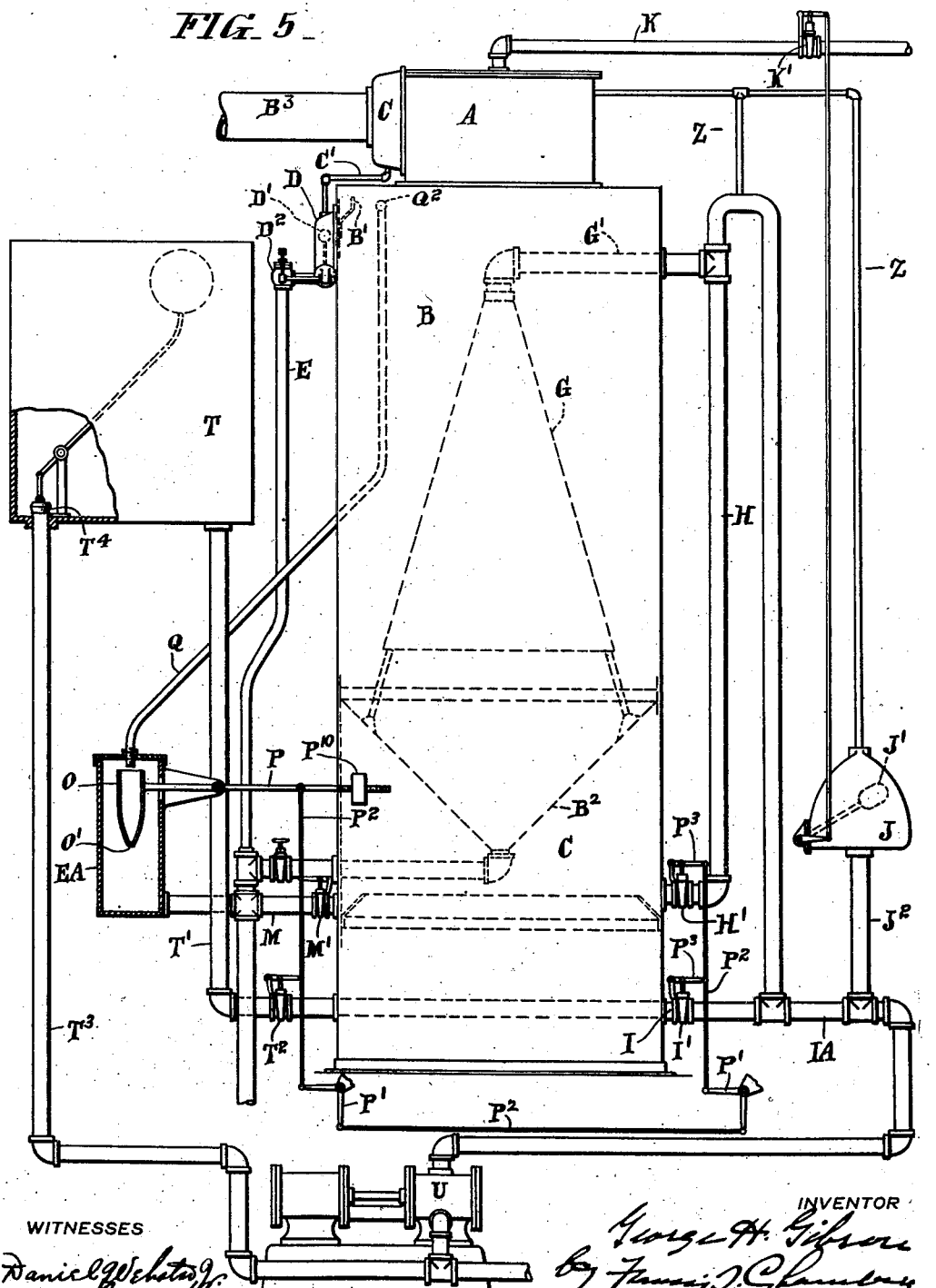

Of the drawings: Figure 1 is a sectional elevation of a preferred form of apparatus embodying my invention; Fig. 2 is a view taken similarly to Fig. 1, illustrating apparatus having a modified form of means for automatically controlling certain of the valves; Fig. 3 is a view taken on a larger scale than Fig. 2 of a portion of the valve operating mechanism shown in Fig. 2; Fig. 4 is a view taken similarly to Fig. 1, illustrating an arrangement in which the various valve connections are manually but simultaneously adjusted; and Fig. 5 is a view taken similarly to Fig. 1, illustrating a modification in which a separate reservoir for the water for washing out the filter is provided.

The apparatus shown in Fig. 1 of the drawings comprises superimposed heating, settling and filter chambers A, B and C, respectively. The water heater of which the chamber A forms the heating chamber is of the well known open feed water heater type, and, as shown, comprises a trough A' into which the water to be treated is introduced, and from which it overflows onto the usual splash trays $A^2$. The heating chamber is open at the bottom through the port $A^3$ to the settling chamber B, and immediately above the port $A^3$ is located a trough $A^4$ into which a suitable chemical purifying agent or agents, such as soda ash, lime, or the like, is discharged through the pipe $A^5$. Steam for heating the water admitted to the chamber A is supplied through the steam supply pipe $B^3$ which opens into the chamber A through the usual oil separator C. The latter drains through the pipe C' into the float chamber D, which also receives the discharge from the overflow connection B' provided in the upper end of the chamber B to limit the maximum height of water level in the chamber B. A float D' located in the chamber D controls the operation of a valve D² which regulates the discharge from the chamber D into the waste pipe E, which, as shown, is connected at its lower end to the sludge pipe F running to the sewer or suitable sump. The pipe F leads from the apex of the conical or hopper bottom B² of the settling reservoir B. F' represents a valve controlling the flow through the pipe F and opened from time to time to permit the sludge collecting at the bottom of the reservoir B to be washed out. The water is withdrawn from the chamber B through a conical member G which has its upper and smaller end connected near the upper end of the chamber B by the horizontal pipe G' to the pipe H, which discharges at its lower end into the upper portion of the filter chamber C above the filter bed C' therein. I represents the usual collecting pipe provided with the usual hooded or strainer inlets $i$ located in the bottom of the filter chamber and connected externally of the latter through the normally open valve I' to the discharge pipe IA running to the boiler feed pump or other device or place for utilizing or disposing of the filtered water. The water to be treated is supplied to the heater A in normal operation through the pipe K, the flow through which is controlled by the valve K'. The latter is automatically operated to regulate the supply of water in correspondence to the demand, by means of a float J' and suitable connections thereto. The float J' works in a float chamber J which is connected to the pipe IA by the pipe J² and is preferably located somewhat above the pipe IA and considerably below the pipe G'. A pipe L is connected at its lower end to the pipe IA and is connected at its upper end to the top of the pipe H through the looped portion L', the top of which is above the level of the pipe G'. This pipe is employed to supply all or a part of the water required under certain conditions, when the clogging of the filter prevents some or all of the water needed from passing through the filter.

In normal operation the water passes from the settling chamber B through the collector G and pipes G' and H to the top or inlet side of the filter chamber C, and after passing through the filter bed in the latter passes through the pipe I and normally open valve I' to the service discharge pipe IA. The normal water level indicated by the line $b$—$b$ which is maintained in the chamber B is fixed by and will pass through the pipe G'. The head or pressure in the pipe H will correspond to the difference in level between the pipe IA and the level indicated by the line $j$—$j$ passing through the float chamber J, the float J' operating to open and close the valve K' as the water level in the chamber J falls below or rises to the level of the line $j$—$j$. The head available for forcing the water through the filter chamber will thus correspond approximately to the difference between the levels of the lines $b$—$b$ and $j$—$j$. As the filter bed C' becomes foul and its resistance to the passage of water is thereby increased, the float J' will operate the valve K' in such manner as to raise the water level in the chamber B, thus slightly increasing the head available for forcing the water through the filter; and eventually, as the filter resistance continues to increase, water will begin to flow through the pipe L into the pipe IA, and so long as the water level in the chamber B is maintained above the bottom of the loop portion L' water will pass to the pipe IA through the pipe L, thus insuring an adequate supply of water to the pipe IA at this time.

Z represents piping connecting the top of the loop L' and the top of the float chamber J to the heating chamber A. This piping serves to prevent a siphon flow through the pipe L, and to prevent the formation of an air pocket in the upper end of the float chamber J restricting the admission of water to the chamber through the pipe J².

The provisions for cleaning or back washing the filter bed C comprise a pipe GA connected at its upper end to the conical collector G, preferably at a level somewhat below that of the pipe G', and connected at its lower end by the normally closed valve GA' to the end of the pipe I remote from the valve I'. The back washing provisions also include a pipe M connecting the filter chamber above the level of the filter bed C' to the waste pipe E. Flow through the pipe M is controlled by the normally closed valve M'.

N represents a pipe which may be employed if desired for blowing compressed air into the bottom of the filter chamber during the back washing operation. The flow through the pipe N is controlled by a valve N'. To bring about the reverse flow or back wash through the filter bed, the normally open valve I' is closed and the normally closed valves GA' and M' are opened. This permits water to flow from the reservoir B through the pipe GA into the pipe I, from which it passes into the filter chamber at the under side of the filter bed C', and after passing through the latter is carried to waste through the pipe M and waste pipe E.

Advantageously, I provide means for automatically actuating the valves I', GA' and M', and also the valve N' if the pipe N be employed, to start the back washing of the filter, whenever the clogging of the filter makes this necessary, and for restoring these valves to their normal condition after the reverse flow through the filter bed has continued for a sufficient time. This I prefer to accomplish by means actuated or set into operation by the rise of the water level in the chamber B to a predetermined height, which may well be at or below the height of water level at which water begins to flow through the looper portion L' of the pipe L. The simple and somewhat conventionally illustrated means for automatically shifting the valves, shown by the drawings, comprises a tilting bucket O located in a chamber EA draining into the waste pipe E and connected by suitable levers P and P' and links $P^2$ to the operating parts $P^3$ of the valves M', GA', I' and N'. When the bucket O, which is provided with a restricted leakage orifice O' at its bottom is empty, its weight is insufficient to overcome the action of a counter weight $P^{10}$, which, through the links and levers described, normally maintains the different valves in the condition for normal operation, i. e., maintains the valve I' open and the valves M', GA' and N' closed. When the bucket O is filled with water, however, its weight overcomes the action of the counter weight and shifts the valve I' into the closed position and the valves M', GA' and N' into their open positions. When thereafter the bucket empties to a sufficient extent the counter weight restores these valves to their normal condition. The bucket O and the leakage orifice O' thereof are so proportioned that under normal conditions, the time required for the filled bucket to empty sufficiently to permit the valves to be restored to their normal condition by the counter weight $P^{10}$, is sufficient for the cleaning of the filter. The bucket O is automatically supplied with water on the predetermined increase in the height of water level in the chamber B by a pipe Q which opens to the chamber B at $Q^2$ at the maximum desired height of water level therein. The lower end of the pipe Q is arranged to discharge into the bucket O. Preferably the pipe Q is formed with a loop Q' providing a water seal between the ends of the pipe. The flow of water out of the chamber B through the pipe GA tends to lower the water level in the chamber B and thus temporarily interrupt the supply of water to the pipe IA. As soon, however, as the level falls below the bottom of the pipe G', a normally submerged float R located in the chamber B drops and thereby opens a valve GB' in a pipe connection GB leading from the collecting cone G to the pipe L at a level preferably below that at which the pipe GA is connected to the cone. This unrestricted supply of water to the pipe IA from the chamber B tends to raise the pressure in the pipe IA, so that the consequent rise in water level in the float chamber J will cause the closure of the valve KA'. To insure a sufficient supply of water at this time for the back washing operation, and for the pipe IA, the float R is also connected to and operates the valve KA' in the branch raw water supply pipe KA leading to the trough A' of the heater A. The valve KA' opens and closes as the float R falls and rises to its uppermost position. When the valve I' is open and the valves M', GA' and N' are closed at the completion of the back washing operation, the pipe GB continues to furnish water to the pipe IA until the rise of water level in the reservoir B operates the float R to close the valves GB' and KA'. As shown, the float R is set not to close these valves until the water level in the reservoir B has almost reached the height at which water begins to flow through the pipe G'.

The temporary interruption in the supply of water to the pipe IA, occurring with the apparatus shown in Fig. 1, while the water level in the chamber B is falling from the height at which the back washing operation is automatically started, to the height at which the float R drops and opens the valve GB', is so slight under ordinary conditions as to be of little practical importance. This temporary interruption in the supply of water to the pipe IA may be readily avoided, however. One arrangement for accomplishing this is illustrated in Figs. 2 and 3, wherein the valve GB' is closed by the float R, as seen in Fig. 1, but is opened at the beginning of the backwashing operation by the means employed for closing the valve I and opening the valves M', GA' and N'. In the particular arrangement shown in Figs. 2 and 3 for accomplishing this, the lever R' carrying the float R has pivotally connected to it, externally of the chamber B, a depending arm $R^{10}$ which in the normal condition of the apparatus engages the operating lever $G^{10}$ of the valve GB' and holds the latter closed against the operation of the spring $G^{11}$ which tends to open the valve. The arm $R^{10}$ is normally held in the position in which its lower end engages the lever $G^{10}$ by a spring $G^{12}$. A bell crank lever $R^{13}$ pivoted at $R^{14}$ and provided at the free end of one arm with a hook or projection $R^{15}$, has the free end of its other arm connected by a link $P^{11}$ to one of the levers P' connected to the bucket O. The connection between the bell crank lever $R^{13}$ and the bucket O is such that when the bucket O is filled and descends at the beginning of the back washing operation, the pin $R^{15}$ carried by the lever $R^{13}$ will move the arm $R^{10}$ into the dotted line position shown in Fig. 3, in which the lower end of the arm no longer engages the valve lever $G^{10}$. This permits the valve GB' to open. When the bucket O, after emptying, is returned to its normal position the arm $R^{10}$ will be moved by the spring $G^{12}$ back into line with the lever $G^{10}$ so that when the float R, then in its lowermost position, is thereafter raised by the return of the water level in the chamber B to the normal working level, the valve GB' will be closed.

Instead of operating the various valves for bringing about and discontinuing the back washing operation automatically, as by such means as are shown in Figs. 1, 2 and 3, these valves or some of them may be operated manually, and in Fig. 4 I have shown an arrangement by which all of the valves are operated manually but simultaneously. As shown in Fig. 4, the valves M', GA', I' and N' are operated by link and lever connections as in Fig. 1, but the primary lever PA instead of being connected to an automatic operating device as the corresponding lever P is connected in Fig. 1, is connected to the manually actuated lever S. As shown in Fig. 4, the valves KA' and GB' are also connected to the manually actuated lever S so that these valves are opened and closed at the same time as the valves M', GA' and N'.

In Fig. 5 I have illustrated the use of certain features of my invention in apparatus in which the water for back washing the filter is not taken directly from the settling chamber but from an auxiliary reservoir provided for the purpose. The apparatus shown in Fig. 5 differs from that shown in Fig. 1 primarily in the omission of the pipes and valves GA, GA', GB, GB', KA and KA' of Fig. 1, and in the addition of the elevated storage reservoir T, the discharge pipe T' from the latter connected to the rear end of the pipe I by the valve $T^2$, and the supply pipe $T^3$ to reservoir T. With the arrangement shown in Fig. 5 it is necessary also to provide a normally open valve H' in the pipe H. As shown, the valve H' is connected to the bucket O so as to be closed thereby during the back washing operation. The valve $T^2$ which is normally closed is connected to the bucket O so as to be opened by the latter during the back washing operation. The supply pipe $T^3$ for the reservoir T, which may lead from the delivery side of the boiler feed pump V, drawing water through pipe IA, is closed by the float operated valve $T^4$ when the reservoir T is filled to the desired level. With the apparatus shown in Fig. 5, the water level in the settling chamber will be maintained at the height at which overflow through the loop L' and pipe L will occur during the back washing operation, but will quickly return to the normal level when the valves are shifted at the conclusion of that operation.

While in accordance with the provisions of the statutes, I have illustrated and described the best forms of my invention now known to me, it will be apparent to those skilled in the art that changes may be made in the form of the apparatus disclosed without departing from the spirit of my invention, and that in some cases certain features of my invention may be used without a corresponding use of other features.

Having now described my invention, what I claim as new and desire to secure by Letters Patent, is:

1. In a water purifying system, the combination with a settling chamber, of a closed filter chamber, means for normally passing water from said settling chamber to said filter chamber, an outlet pipe from said filter chamber, a valve controlling the flow of water out of said filter chamber through said pipe, means for establishing a reverse flow through said filter chamber from said settling chamber and a by-pass about said filter chamber and valve, connecting said discharge pipe and settling chamber.

2. In a water purifying system, the combination with a settling chamber, a closed filter chamber and connections through which water normally flows from said settling chamber to and through the filter chamber, of valved connections for establishing a reverse flow through said filter chamber from said settling chamber, and means responsive to the resistance to flow through the filter bed in normal operation for automatically adjusting said valved connections to establish said reverse flow on a predetermined increase in said resistance.

3. In a water purifying system, the combination with a settling chamber, a filter chamber and connections through which water normally flows from said settling chamber to and through the filter chamber, of valved connections for establishing a reverse flow from said settling chamber through said filter chamber to clean the filter therein, and means responsive to the height of water level in said settling chamber for automatically adjusting said valved connections to establish said reverse flow on a predetermined rise in said water level above the water level normally maintained in said chamber.

4. In a water purifying system, the combination with a settling chamber, a filter chamber, a connection leading from said settling chamber to the inlet side of said filter chamber, and a discharge pipe leading from the outlet side of said filter chamber, of a valve controlling the flow out of said filter chamber through said discharge pipe, a valved connection leading to the outlet side of said filter chamber from said settling chamber and opening to the latter at a level below the normal water level therein, and a valved connection leading to said discharge pipe from said settling chamber and means set in operation by a predetermined rise of water level in the settling chamber above the normal water level therein for closing said valve and opening said valved connections.

5. In a water purifying system, the combination with a settling chamber, a filter chamber, a connection leading from said settling chamber to the inlet side of said filter chamber, a discharge pipe leading from the outlet side of said filter chamber, a valve controlling the flow out of said filter chamber through said discharge pipe, a by-pass about said filter chamber and valve connecting said settling chamber to said discharge pipe and including a portion located above the normal water level in said settling chamber, a second by-pass about said filter chamber and valve connecting said discharge pipe to said settling chamber at a level below the normal water level in said settling chamber, a valved connection between said settling chamber and the outlet side of said filter chamber, a valved discharge connection leading from the inlet side of said filter chamber, and means responsive to the height of water level in said settling chamber and set in operation by a rise of water level above the normal level for closing said valve and opening said valved connections and said second by-pass.

6. In a water purifying system, the combination with a settling chamber, a filter chamber, a connection leading from said settling chamber to the inlet side of said filter chamber, a discharge pipe leading from the outlet side of said filter chamber, a valve controlling the flow out of said filter chamber through said discharge pipe, a by-pass about said filter chamber connecting said settling chamber to said discharge pipe and including a portion located above the normal water level in said settling chamber, a second by-pass about said filter chamber and valve connecting said discharge pipe to said settling chamber at a level below the normal level in said settling chamber, a valved connection between said settling chamber and the outlet side of said filter chamber, a valved discharge connection leading from the inlet side of said filter chamber, means responsive to the pressure in said discharge pipe normally controlling the admission of water to said settling chamber, a supplemental water supply connection to said settling chamber and means responsive to the height of water level in said settling chamber for opening said supplemental connection when the water level in the settling chamber falls to a predetermined distance below the level normally maintained in said settling reservoir.

7. In a water purifying system, the combination with a settling chamber, a filter chamber, a connection leading from said settling chamber to the inlet side of said filter chamber, a discharge pipe leading from the outlet side of said filter chamber, a valve controlling the flow out of said filter chamber through said discharge pipe, a by-pass about said filter chamber and valve connecting said settling chamber to said discharge pipe and including a portion located above the normal water level in said settling chamber, a second by-pass about said filter chamber and valve connecting said settling chamber to said discharge pipe at a level below the normal level in said settling chamber, a valved connection between said settling chamber and the outlet side of said filter chamber, and a valved discharge connection leading from the inlet side of said filter chamber.

8. In a water purifying system, the combination with a settling chamber, a closed filter chamber, a connection leading from said settling chamber to the inlet side of said filter chamber, a discharge pipe leading from the outlet side of said filter chamber, a valve controlling the flow out of said filter chamber through said discharge pipe, a by-pass about said filter chamber and valve connecting said settling chamber to said discharge pipe, other valved connections to said filter chamber whereby a reverse flow through said filter chamber may be established, and means responsive to the height of water level in said settling chamber and set in operation by a rise of water level therein above the normal level for closing said valve and opening said valved connections.

9. In a water purifying system, the combination with a settling chamber, a closed filter chamber, a discharge pipe, connections whereby water normally flows into said discharge pipe through said filter chamber from said settling chamber, a normally ineffective by-pass about said filter chamber connecting said settling chamber to said discharge pipe, connections whereby a reverse flow through said filter chamber may be established, and means set in operation by a predetermined rise of water level in the settling chamber for preventing the normal flow through said filter chamber and establishing a reverse flow through the latter, and for establishing a flow from said settling chamber into said discharge pipe through said by-pass.

10. In a water purifying system, the combination with a settling chamber, a closed filter chamber and a discharge pipe, of connections whereby water normally flows into said discharge pipe through said filter chamber from said settling chamber, a by-pass about said filter chamber connecting said settling chamber to said discharge pipe to permit water to flow into the latter from said settling chamber when the normal flow through the filter chamber is interrupted, and means set in operation by a predetermined rise in water level in the settling chamber above the normal water level therein for preventing said normal flow through the filter chamber and establishing a reverse flow through the latter.

GEO. H. GIBSON.

Witnesses:
 NORMAN K. CONDERMAN,
 ROBERT G. CLIFTON.